US010083791B2

(12) United States Patent
Njiende T. et al.

(10) Patent No.: US 10,083,791 B2
(45) Date of Patent: Sep. 25, 2018

(54) INTEGRATED MAGNETICS FOR SOFT SWITCHING CONVERTER

(71) Applicant: DET INTERNATIONAL HOLDING LIMITED, George Town, Grand Cayman (KY)

(72) Inventors: Hugues Douglas Njiende T., Paderborn (DE); Frank Schafmeister, Warburg (DE); Rongyuan Li, Paderborn (DE); Peter Ide, Soest (DE)

(73) Assignee: DET INTERNATIONAL HOLDING LIMITED, George Town, Grand Cayman (KY)

( * ) Notice: Subject to any disclaimer, the term of this patent is extended or adjusted under 35 U.S.C. 154(b) by 0 days.

(21) Appl. No.: 13/924,075

(22) Filed: Jun. 21, 2013

(65) Prior Publication Data

US 2013/0343091 A1  Dec. 26, 2013

(30) Foreign Application Priority Data

Jun. 22, 2012 (EP) .................................. 12405059

(51) Int. Cl.
*H01F 27/28* (2006.01)
*H01F 30/06* (2006.01)
*H01F 3/10* (2006.01)
*H01F 27/38* (2006.01)
*H01F 41/06* (2016.01)
*H02M 3/24* (2006.01)
(Continued)

(52) U.S. Cl.
CPC ............... *H01F 30/06* (2013.01); *H01F 3/10* (2013.01); *H01F 27/28* (2013.01); *H01F 27/38* (2013.01); *H01F 41/06* (2013.01); *H02M 3/24* (2013.01); *H01F 2038/026* (2013.01); *H02M 3/337* (2013.01); *Y10T 29/49071* (2015.01)

(58) Field of Classification Search
USPC ......................... 336/170, 171, 200, 212–215
See application file for complete search history.

(56) References Cited

U.S. PATENT DOCUMENTS 2,365,722 A * 12/1944 Carlisie ................ B23K 9/1006
219/130.1
3,365,657 A * 1/1968 Webb .................... H02J 3/1835
174/DIG. 17
5,539,630 A * 7/1996 Pietkiewicz et al. ........... 363/17
(Continued)

FOREIGN PATENT DOCUMENTS

EP  2 071 596 A2  6/2009
EP  2 299 456 A1  3/2011
(Continued)

OTHER PUBLICATIONS

Chen et al., "Synthesis and design of integrated-magnetic-circuit transformer for VRM application", vol. 153, No. 3, May 1, 2006 (May 1, 2006), pp. 369-378.

*Primary Examiner* — Tuyen Nguyen
(74) *Attorney, Agent, or Firm* — Birch, Stewart, Kolasch & Birch, LLP

(57) ABSTRACT

In an integrated magnetic component for a switched mode power converter, comprising two magnetic cores forming an 8-shaped core structure and at least two first electric winding wires, wherein at least one magnetic core is an E-core, at least one of the first electric winding wires is wound on a flange of the E-core.

14 Claims, 7 Drawing Sheets

(51) Int. Cl.
*H01F 38/02* (2006.01)
*H02M 3/337* (2006.01)

(56) References Cited

U.S. PATENT DOCUMENTS

| | | | | |
|---|---|---|---|---|
| 5,555,494 | A | * | 9/1996 | Morris ............................ 363/17 |
| 5,920,473 | A | * | 7/1999 | Sturgeon .................. H01F 3/10 |
| | | | | 363/132 |
| 6,304,460 | B1 | * | 10/2001 | Cuk ................................ 363/16 |
| 6,362,986 | B1 | | 3/2002 | Schultz et al. |
| 6,388,896 | B1 | * | 5/2002 | Cuk ................................ 363/16 |
| 6,862,195 | B2 | | 3/2005 | Jitaru |
| 2002/0118000 | A1 | | 8/2002 | Xu et al. |
| 2008/0224809 | A1 | | 9/2008 | Zhang et al. |
| 2009/0185398 | A1 | * | 7/2009 | Cuk ........................ H02M 1/34 |
| | | | | 363/21.1 |
| 2012/0262086 | A1 | * | 10/2012 | Feldtkeller .................... 315/291 |
| 2013/0201728 | A1 | | 8/2013 | Njiende et al. |

FOREIGN PATENT DOCUMENTS

| | | | |
|---|---|---|---|
| EP | 2624260 | A1 | 8/2013 |
| JP | 8-298219 | A | 11/1996 |

* cited by examiner

INTEGRATED MAGNETICS FOR SOFT SWITCHING CONVERTER

TECHNICAL FIELD

The invention relates to an Integrated magnetic component for a switched mode power converter comprising two magnetic cores forming an 8-shaped core structure and at least two first electric winding wires, wherein a first magnetic core is an E-core. Furthermore, the invention relates to an integrated magnetic element, a method for manufacturing an integrated magnetic component, a soft switching converter and an LLC resonant converter according to the coordinate independent claims.

BACKGROUND ART

Switched mode power supplies as key components of telecom and commercial systems often dictate their size and electrical performance as well as reliability and costs. As requirements for the key characteristics of power converters (e.g. power density and efficiency) increase, the demands of these key characteristics increase for inductive components in particular. One approach of increasing the power density and the efficiency in such systems is to integrate the inductive components. For example, transformers and inductors can be integrated into a single magnetic structure, thereby reducing cost, increasing power density and equally increasing power efficiency.

Circuits where integrated magnetics are highly advantageous are soft switching converters (U.S. Pat. No. 6,862,195), which are capable of yielding high efficiency while operating at high switching frequency. A typical soft switching converter uses three magnetic components: a parallel resonant inductor, a two-winding transformer and a series filter inductor. This converter results, additionally to the number of discrete magnetic components which yield higher size and costs, in at least three windings and several interconnections which negatively impact the efficiency.

The parallel primary resonant inductor and the transformer are generally integrated into one component. An air gap is ground in the non ideal transformer in order to adjust the magnetizing inductance which replaces the parallel primary resonant inductance.

In recent years some efforts were done to integrate all three magnetic components into a single component for LLC resonant converter. Some integrated magnetic structures are shown in US 2008/0224809. An additional inductor winding, which constitutes the series resonant inductance, is introduced to enhance the leakage inductance of the transformer.

While US 2008/0224809 addresses some appropriate ameliorations to typical soft resonant LLC converters, there are still some setbacks: mostly E-cores from retail are employed and bobbins are unavoidable to wind the coils. The bobbins negatively affect the costs, the power density, the power efficiency and the thermal distribution. There are supplementary power losses due to air gap fringing fields and higher winding mean length. The bobbins are costly and cause more leakage and inductance losses. Additionally, they reduce the power density and increase the thermal resistance. Furthermore, the integrated magnetic components disclosed in US 2008/0224809 are comparably complicated to manufacture due to their complex geometries, their number of windings and the relative positions of these windings in respect to each other.

SUMMARY OF THE INVENTION

It is the object of the invention to create an integrated magnetic component pertaining to the technical field initially mentioned, that has a high power density and efficiency, that is cheap and easy to manufacture and that has a simple design.

The solution of the invention is specified by the features of claim 1. In an integrated magnetic component for a switched mode power converter, in particular for a soft switching converter and/or for an LLC resonant converter, according to the invention, which comprises two magnetic cores forming an 8-shaped core structure and at least two first electric winding wires, wherein a first magnetic core is an E-core, at least one of the first electric winding wires is wound on a flange of the E-core. "Flange" is to be understood as one of the two vertical parts of an upright-standing E-core which separate the three horizontal legs of an upright-standing E-core from one another. The term "B-core" is to be understood as "B-core and/or ER-core", where ER-core describes an E-core in which the centre leg of the E-core is of cylindrical shape and/or the lateral legs of the E-core have at least partially round side portions, particularly round inner side portions.

Using the flanges of the E-core rather than the legs for placing windings helps to enable a straight-forward manufacturing process and leads to high power density and high efficiency of the integrated magnetic component.

In a preferred embodiment, a second magnetic core of the 8-shaped core structure is an E-core. The use of an E-core as a second magnetic core has the advantage that both magnetic cores have, at least approximately, the same shape and that the manufacturing of the integrated magnetic component and its handling is therefore optimized. In a further typical embodiment, the 8-shaped core structure is an I-core. The use of an I-core has the advantage that it is extremely easy to handle. However, the second magnetic core can also have a different shape. It can, for example be a U-core. In the latter case, a centre leg of the first magnetic core, which is typically an E-core, is preferably longer than two lateral legs of this particular first magnetic core.

In a preferred embodiment, the integrated magnetic component comprises at least two second electric winding wires. Preferably, the first magnetic core comprises one first electric winding wire and one second electric winding wire. Preferably, the second magnetic core also comprises one first electric winding wire and one second electric winding wire. The use of at least two second electric winding wires in addition to the first electric winding wires has the advantage that a galvanic insulation between two sides of the integrated magnetic component can easily be obtained. However, it is not absolutely necessary to use at least two electric winding wires. It could also be possible to use only one second electric winding wire.

In a typical embodiment, at least one electric winding is wound directly on one of the magnetic cores. This means that no bobbin is used. Omission of the bobbin has the advantage that it leads to a tremendous increase of winding window utilisation compared to a design where a bobbin is located between the electric winding wire and the magnetic core. The increased window utilisation is associated with an increase of power density. Another advantage is that the thermal resistance between core and winding is decreased. This leads to an improved efficiency of the integrated magnetic component. In a typical embodiment, all electric winding wires are wound directly on the magnetic cores. However, it is also possible to only wind some electric winding wires—e.g. only the first electric winding wires—directly onto the magnetic cores and to use bobbins for the remaining electric winding wires—e.g. the second electric winding wires.

In a preferred embodiment, the first electric winding wires are connected to each other by a first soldering joint and/or the second electric winding wires are connected to each other by a second soldering joint. This has the advantage that manufacture of the integrated magnetic component is simplified, because the first magnetic core, on which are typically wound at least partly one first electric winding wire and one second electric winding wire, and second magnetic core, on which are also typically wound at least partly one first electric winding wire and one second electric winding wire, can be easily connected and assembled to form the integrated magnetic structure in this way. However, the use of soldering joints is not mandatory. The connections between the respective wires can also be made in different ways appropriate to establish proper electric and/or mechanical connections.

In a preferred embodiment, at least one of the first electric winding wires comprises and/or forms two windings. Preferably, both first electric winding wires comprise and/or form each two windings. It is, however, also possible that the first electric winding wires form only one winding or more than two windings. In particular, the number of windings can be different for the two first electric winding wires. One advantage of one electric winding comprising and/or forming two windings is that the overall number of electric winding wires necessary to manufacture the integrated magnetic component is reduced. Therefore, the number of soldering joints needed to be established during manufacture is also reduced. This leads to an easier and cheaper manufacturing process.

In a typical embodiment, at least one of the second electric winding wires is wound on a flange of one of the E-cores or on the I-core. It is particularly preferred that one second electric winding wire is wound on a flange of the first magnetic core, which is typically an E-core, and one of the second electric winding wires is wound either on a flange of the second magnetic core, in the case where the second magnetic core is an E-core, or on the I-core if the second magnetic core is an I-core. Winding at least one of the electric winding wires in such a way is advantageous because it homogenizes the construction of the integrated magnetic structure and leads to improved electric performance, for example advantageous flux distribution. In principle, it is however also possible to wind the second electric winding wires differently, e.g. around the legs of the second magnetic core in the case where the latter is an E-core.

In a preferred embodiment, the 8-shaped core structure comprises an air gap. In a particularly preferred embodiment, the 8-shaped core structure comprises three are gaps, whereby—in the case where the second magnetic core is an E-core—each of the three legs of the first E-core is typically separated from a corresponding leg of the second E-core by one air gap. The presence of air gaps has the advantage to help to adjust the primary magnetizing inductance, the output filter inductances as well as the transformer turn ratio of the integrated magnetic component. It is particularly preferred if the air gaps are filled with a material, particularly plastic material, with appropriate electrical properties An example for such an appropriate electrical property can for example be electrical non-conductivity which has the advantage to avoid additional skin effect losses. However, the presence of air gaps is not mandatory. The integrated magnetic component can also be configured without air gaps or with less than three air gaps or even with more than three air gaps.

In a preferred embodiment, the air gap is/the air gaps are centrally located in the 8-shaped core structure, which means that it has/they have the same distance from the flanges of each E-core in the case where both magnetic cores are E-cores or the same distance from the flanges of the E-core and the I-core in the case where the second magnetic structure is an I-core. Preferably, the air gap is/the air gaps are approximately parallel to the flanges of the E-cores and/or the I-core. Such an arrangement of the air gaps has the advantage that a highly appropriate flux management and a high efficiency of the integrated magnetic component can be obtained. In particular, such an arrangement of air gaps yields a drastic reduction of AC copper losses caused by air gap fringing fields. However, it is also possible that the air gap is/the air gaps are not centrally located and/or the air gaps are not approximately parallel to the flanges of there E-cores and/or the I-core and/or the distances are not the same.

In a preferred embodiment, the 8-shaped core structure and/or at least one of the magnetic cores comprises a slanted edge. Compared to a sharp edge, i.e. an edge of approximately 90°, a slanted edge has the advantage that it is less sharp and that an electric winding wire which is directly wound onto at least one of the magnetic cores is therefore less prone to be damaged by a sharp edge. It is also possible to use an at least partially rounded or round edge instead of a slanted edge. Any edge type is in principle suitable as long as it is not sharp enough to damage the electric winding wires.

In a typical embodiment, three windings are wound on each magnetic core. In the case where both magnetic cores are E-cores, it is particularly preferred that one winding is wound on a first flange of each E-core and two windings are wound on a second flange of each E-core. In the case where one magnetic core is an E-core and the other one is an I-core, it is particularly preferred that one winding is wound on a first flange of the E-core and two windings are wound on a second flange of the E-core and three windings are wound consecutively on the I-core.

In an integrated magnetic element according to the invention comprising a magnetic core in the form of an E-core and two electric winding wires, the electric winding wires are wound on the flanges of the E-core. Preferably, the wires are wound bobbin-less, i.e. directly, on the flanges. In typical embodiments, the winding wires are used to wind two windings on one flange of the E-core and one winding on the other flange of the E-core.

A method for manufacturing an integrated magnetic component according to the invention comprises the steps
  providing a first winding by winding a first electric winding wire around a first flange of a first E-core,
  providing a second winding by winding the first electric winding wire around a second flange of the first E-core,
  providing a fifth winding by winding a second electric winding wire around the second flange of the first E-core,
  providing a third winding by winding a supplementary first electric winding wire around a first flange of a second E-core or around an I-core,
  providing a fourth winding by winding the supplementary first electric winding wire around a second flange of the second E-core or around the I-core and providing a sixth winding by winding a supplementary second electric winding wire around the second flange of the second E-core or around the I-core.

In a preferred method for manufacturing an integrated magnetic component, preferably after the six windings have been wound on the cores, the first E-core and the second E-core or the I-core are fixed to each other, the first electric winding wires are soldered to each other and the second electric winding wires are soldered to each other.

A soft switching converter according to the invention comprises an integrated magnetic component according to the invention.

An LLC converter according to the invention comprises an integrated magnetic component according to the invention.

The integrated magnetic component according to the invention has a compact assembly which leads to reduction of copper losses and overall reduction of stray inductances. Transient characteristics of the converter are equally ameliorated.

Other advantageous embodiments and combinations of features come out from the detailed description below and the totality of the claims.

BRIEF DESCRIPTION OF THE DRAWINGS

The drawings used to explain the embodiments show.

In the figures, the same components are given the same reference symbols.

PREFERRED EMBODIMENTS

Figure 1:
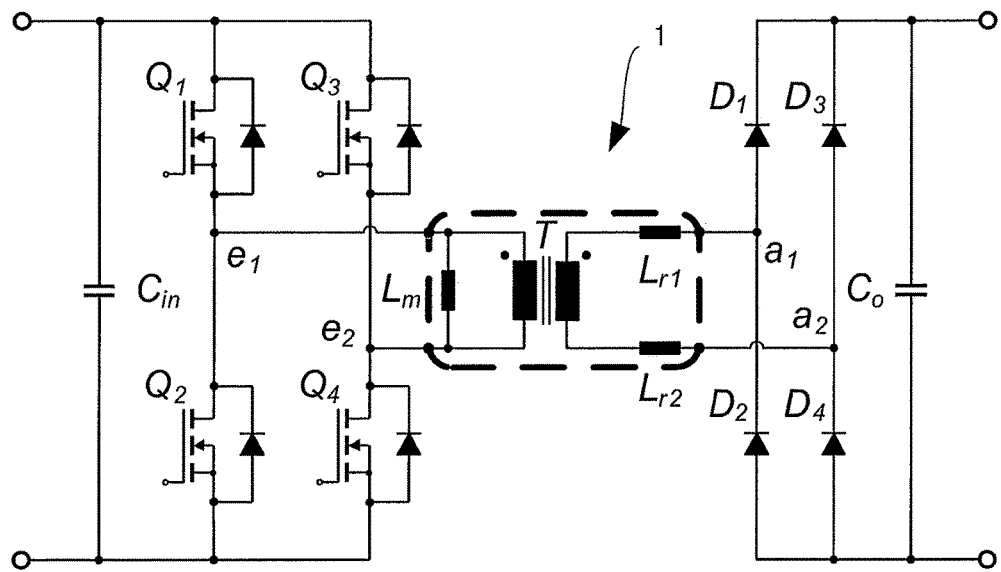
FIG. 1: Equivalent circuit of a soft switching converter circuit, one possible circuit in which an integrated magnetic component according to the invention can be used.

FIG. 1 shows an equivalent circuit of a soft switching converter circuit, one possible circuit in which an integrated magnetic component according to the invention can be used. The soft switching converter circuit comprises an input circuit comprising four switching devices Q1, Q2, Q3, Q4 and an input capacitor $C_{in}$, an output circuit comprising four diodes D1, D2, D3, D4 and an output capacitor $C_o$, as well as the integrated magnetic component 1 according to the invention. The equivalent circuit of the integrated magnetic component 1 comprises two input resonant inductors $L_{r1}$ and $L_{r2}$, a parallel resonant inductor $L_m$ and a transformer T.

Figure 2:
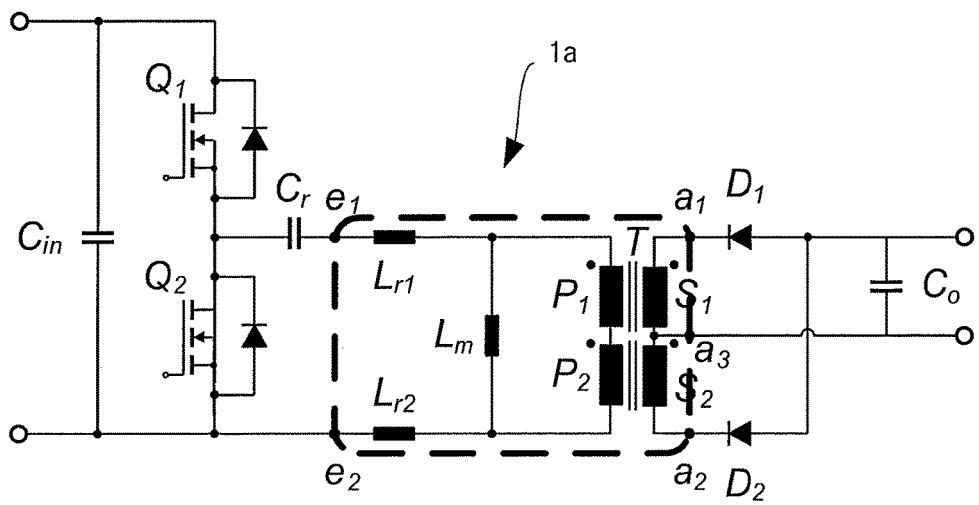
FIG. 2: equivalent circuit of an LLC resonant converter circuit, another possible circuit in which an integrated magnetic component according to the invention can be used.

FIG. 2 shows an equivalent circuit of an LLC resonant converter circuit, another possible circuit in which an integrated magnetic component according to the invention can be used. LLC resonant converter circuit comprises an input circuit comprising two switching devices Q1, Q2 and an input capacitor $C_{in}$, an output circuit comprising two diodes D1, D2 and an output capacitor $C_o$, as well as the integrated magnetic component 1a according to the invention. The equivalent circuit of the integrated magnetic component 1a comprises a parallel resonant inductor $L_m$, a transformer T and two output filter chokes $L_{r1}$ and $L_{r2}$.

Figure 3:
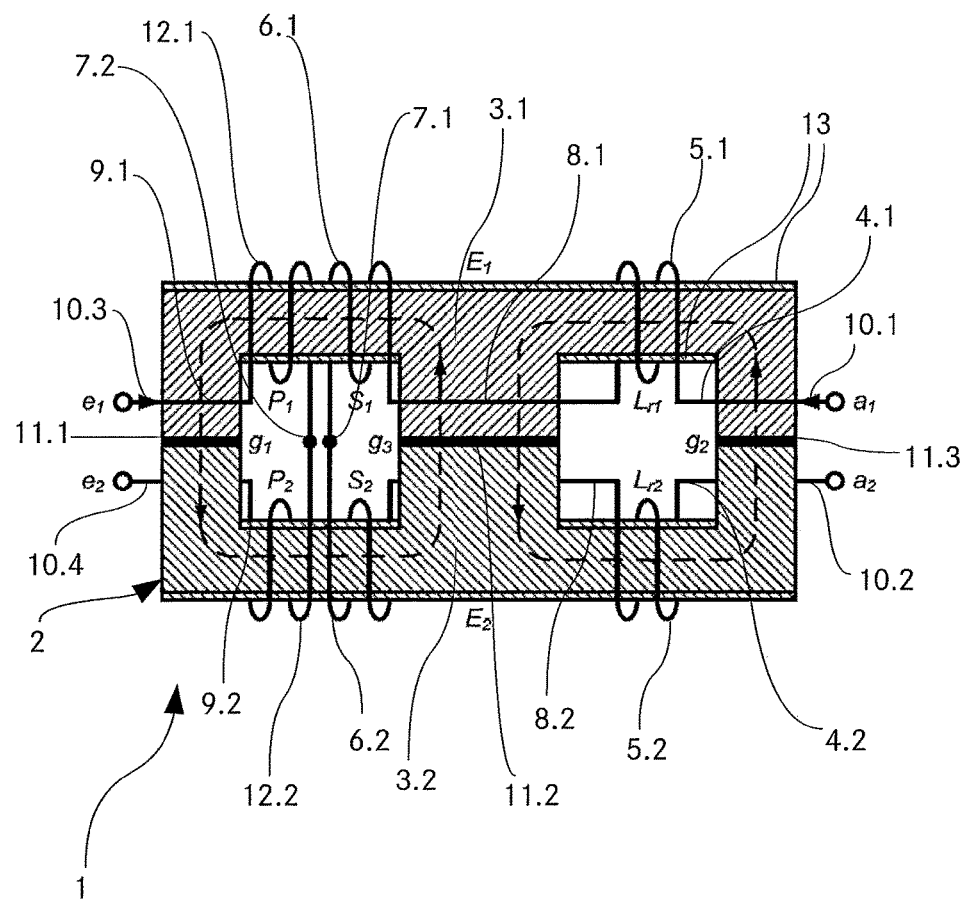
FIG. 3: schematic view of an integrated magnetic component according to the invention (first embodiment)

FIG. 3 shows a schematic view of the integrated magnetic component 1 according to the invention. The integrated magnetic component 1 comprises an 8-shaped core structure 2 comprising a first magnetic core 3.1 and a second magnetic core 3.2. Both magnetic cores 3.1 and 3.2 are in the form of E-cores.

A first electric winding wire 4.1 is wound around the first magnetic core 3.1. The first electric winding wire 4.1 comprises a first winding 5.1—being wound around a first flange of the first magnetic core 3.1 and constituting a winding of the first output filter choke $L_{r1}$—and a second winding 6.1—being wound around a second flange of the first magnetic core 3.1 and constituting a first secondary winding S1 of the transformer T. A supplementary first electric winding wire 4.2 is wound around the second magnetic core 3.2. The supplementary first electric winding wire 4.2 comprises a third winding 5.2—being wound around a first flange of the second magnetic core 3.2 and constituting a winding of the second output filter choke $L_{r2}$—and a fourth winding 6.2—being wound around a second flange of the second magnetic core 3.2 and constituting a second secondary winding S2 of the transformer T. The first electric winding wire 4.1 and the supplementary first electric winding wire 4.2 are connected to each other via a first soldering joint 7.1. The first electric winding wire 4.1 comprises a connecting section 8.1 which connects the first winding 5.1 to the second winding 6.1. Analogically, the supplementary first electric winding wire 4.2 comprises a connecting section 8.2 which connects the third winding 5.2 to the fourth winding 6.2. The connecting sections 8.1 and 8.2 are placed on opposite sides of the 8-shaped core structure 2. The first electric winding wire 4.1 comprises a wire end section 10.1 and the supplementary first electric winding wire 4.2 comprises a wire end section 10.2. The wire end sections 10.1 and 10.2 are placed on opposite sides of the 8-shaped core structure 2.

A second electric winding wire 9.1 is wound around the second flange of the first magnetic core 3.1 thus creating a fifth winding 12.1, constituting a first primary winding P1 of the transformer T. A supplementary second electric winding wire 9.2 is wound around the second flange of the second magnetic core 3.2 thus creating a sixth winding 12.2, constituting a second primary winding P2 of the transformer T. The second electric winding wire 9.1 and the supplementary second electric winding wire 9.2 are connected to each other via a second soldering joint 7.2. The second electric winding wire 9.1 comprises a wire end section 10.3 and the supplementary second electric winding wire 9.2 comprises a wire end section 10.4. The wire end sections 10.3 and 10.4 are placed on opposite sides of the 8-shaped core structure 2.

The wire end sections 10.1 and 10.3 as well as the connecting section 8.1 are placed on one side of the 8-shaped core structure 2 while the wire end sections 10.2 and 10.4 as well as the connecting section 8.1 are placed on the other side of the 8-shaped core structure 2.

The 8-shaped core structure 2 comprises three air gaps 11.1, 11.2 and 11.3. Air gaps 11.1 and 11.3 separate the two lateral legs of each magnetic core 3.1, 3.2 from the respective lateral legs of the other magnetic core 3.1, 3.2. The centre legs of the magnetic cores 3.1, 3.2 are separated by air gap 11.2.

The six windings 5.1, 5.2, 6.1, 6.2, 12.1 and 12.2 are wound directly—i.e. bobbin-less—on the four flanges of the 8-shaped magnetic core structure 2 supplied by the two magnetic cores 3.1 and 3.2. The magnetic core structures 3.1 and 3.2 each comprise several slanted edges 13. These slanted edges 13 are less prone to damaging the electric winding wires 4.1, 4.2, 9.1 and 9.2 than sharp 90-degree edges.

The introduction of the air gap 11.1 in the flux path of the transformer T corresponds to an integration of the transformer T and the parallel resonant inductor $L_m$ (see FIG. 1). The thus created parallel inductance is adjustable through the configuration of the air gap 11.1 while the turn ratio of the transformer T is unchanged.

The fact that the cores of the gapped transformer T and the output filter chokes $L_{r1}$ and $L_{r2}$ are put together in a common centre leg composed by the two centre legs of the magnetic cores 3.1 and 3.2 leads to a cancellation of flux in this common centre leg and thus to a reduction of core losses.

The structure for the integration of the inductors $L_m$, $L_{r1}$ and $L_{r2}$ and the transformer T (shown in FIG. 1) with parallel input inductance $L_m$, transformer T and coupled output filter chokes $L_{r1}$ and $L_{r2}$ wound on bobbin-less E-cores as shown in FIG. 3 can be summarized as follows: The structure comprises two magnetic cores 3.1 and 3.2 formed as E-cores (use of ER-cores is also possible), three air gaps 11.1, 11.2 and 11.3 as well as six windings 5.1, 5.2, 6.1, 6.2, 12.1 and 12.2. Windings 12.1 and 12.2 constitute two primary windings P1 and P2 of the transformer T. Windings 6.1 and 6.2 constitute two secondary windings S1 and S2 of the transformer T. Windings 5.1 and 5.2 constitute the windings of the first and second output filter chokes $L_{r1}$ and $L_{r2}$. The first and second output filter chokes $L_{r1}$ and $L_{r2}$ are wound symmetrically on different flanges and are optimally coupled.

Figure 4:
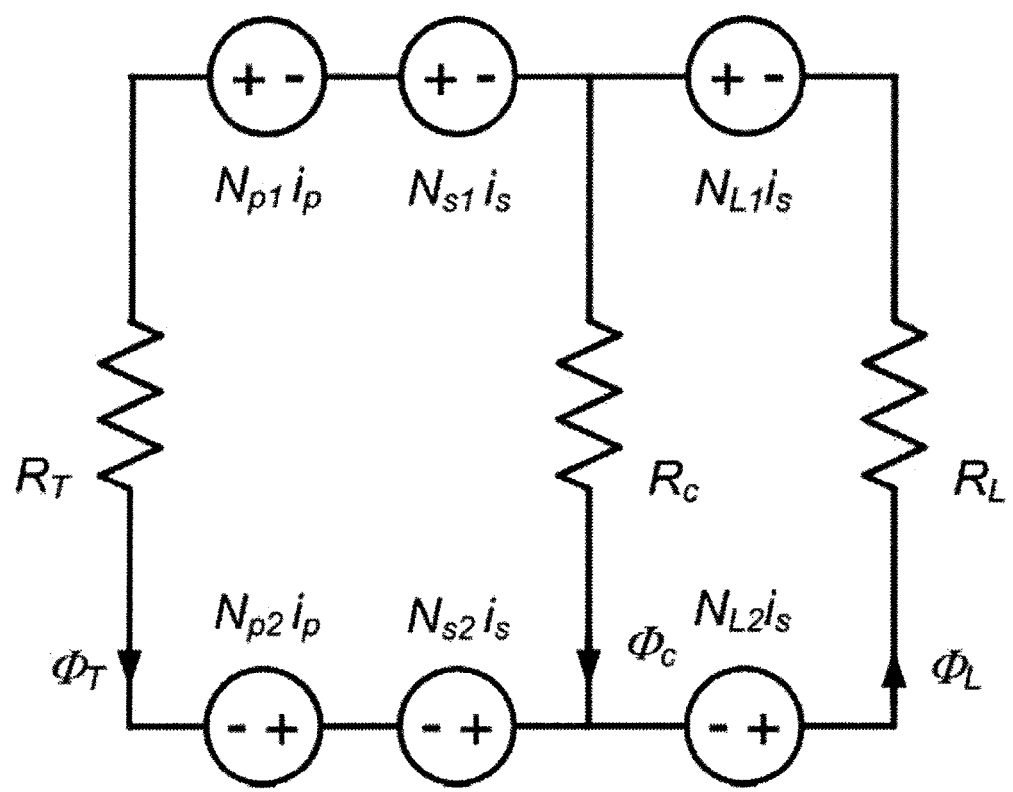
FIG. 4: reluctance model of the embodiment of FIG. 3.

The corresponding reluctance model of the embodiment of FIG. 3 is shown in FIG. 4. $R_L$ represents the reluctance of the inductance core (right lateral legs and transversal flanges of magnetic cores 3.1 and 3.2 as shown in FIG. 3) with consideration of its respective air gap 11.3, $R_T$ represents the reluctance of transformer core (left lateral legs and transversal flanges of magnetic cores 3.1 and 3.2 as shown in FIG. 3) with consideration of its respective air gap 11.1 and $R_c$ represents the reluctance of the centre core (constituted by the two centre legs of the magnetic cores 3.1 and 3.2) with consideration of its respective air gap 11.2.

After mathematical description of the reluctance model and application of Faraday's Law on all windings, some equation manipulations yield the inductance matrix of the integrated component which is calculated to be:

$$L = \begin{pmatrix} L_{11} & M_{12} \\ M_{12} & L_{22} \end{pmatrix}$$

$$= \begin{pmatrix} \dfrac{(R_L + R_c) \cdot N_p^2}{R_T \cdot (R_L + R_c) + R_L \cdot R_c} & \dfrac{(R_c \cdot N_L + (R_L + R_c) \cdot N_s) \cdot N_p^2}{R_T \cdot (R_L + R_c) + R_L \cdot R_c} \\ \dfrac{(R_c \cdot N_L + (R_L + R_c) \cdot N_s) \cdot N_p}{R_T \cdot (R_L + R_c) + R_L \cdot R_c} & \dfrac{(R_L + R_c) \cdot N_s^2 + 2R_c \cdot N_s N_L + (R_T + R_c) \cdot N_L^2}{R_T \cdot (R_L + R_c) + R_L \cdot R_c} \end{pmatrix}$$

With $$N_{p1} = N_{p2} = N_p/2, \; N_{s1} = N_{s2} = N_s/2 \text{ and } N_{L1} = N_{L2} = N_L/2.$$

Using calculated elements of the inductance matrix, primary $L_{11}$, secondary self inductances $L_{22}$ and the mutual inductance $M_{12}$, parameters of transformer π model, the magnetizing inductance $L_m$, the secondary leakage inductance $L_r$ and the equivalent secondary turn number $N_{sn}$ are respectively described as $$L_m = L_{11} = \frac{N_p^2}{R_T + R_L // R_c},$$

$$L_r = L_{22} - \frac{M_{12}^2}{L_{11}} = \frac{N_L^2}{R_L + R_c},$$

$$N_{sn} = N_p \frac{M_{12}}{L_{11}} = N_s + \frac{R_c}{R_L + R_c} N_L.$$

$N_s$ turns are wound but the transformer exhibits $N_{sn}$ turns. By introducing an air gap in the centre leg, the effective secondary number of turns $N_{sn}$ becomes higher than the factual number of turns $N_s$ which allows reducing secondary copper losses.

For high permeability low saturation flux density material with no air gap in the centre core ($g_3 \approx 0$), just $R_c \ll R_L, R_T$, the gapped transformer and output filter inductor are magnetically decoupled and the primary leakage inductance $L_r$, the magnetizing inductance $L_m$ and the equivalent secondary turn number $N_{sn}$ are simplified to be respectively:

$$L_r \approx \frac{N_L^2}{R_L}, \; L_m \approx \frac{N_p^2}{R_T} \text{ and } N_{sn} \approx N_s.$$

The fluxes and flux densities in transformer leg ($\Phi_T$, $B_T$), in choke leg ($\Phi_L$, $B_L$) and in centre leg ($\Phi_c$, $\Phi_c$) are respectively calculated as follows:

$$\Phi_T(t) = B_T(t) \cdot A_T = \frac{R_T \cdot \left(\frac{N_p I_m(t)}{R_T}\right) - (R_L // R_c) \cdot \left(\frac{N_L I_L(t)}{R_L}\right)}{R_T + R_L // R_c}$$

$$\Phi_L(t) = B_L(t) \cdot A_L = \frac{R_L \cdot \left(\frac{N_L I_L(t)}{R_L}\right) - (R_T // R_c) \cdot \left(\frac{N_p I_m(t)}{R_T}\right)}{R_L + R_T // R_c}$$

$$\Phi_c(t) = B_c(t) \cdot A_c = \Phi_T(t) - \Phi_L(t)$$

where $I_m$ is the transformer magnetizing current.

For high permeability low saturation flux density material with no air gap in the centre core ($g_3 \approx 0$), just $R_c \ll R_L, R_T$, the gapped transformer and output filter inductor are magnetically decoupled and the transformer leg flux and the filter inductor leg flux are simplified to be respectively:

$$\Phi_{Td}(t) = B_{Td}(t) \cdot A_T \approx \frac{N_p I_m(t)}{R_T}$$

$$\Phi_{Ld}(t) = B_{Ld}(t) \cdot A_L \approx \frac{N_L I_L(t)}{R_L}$$

$$\Phi_{cd}(t) = B_{cd}(t) \cdot A_c \approx \Phi_{Td}(t) - \Phi_{Ld}(t)$$

Figure 5:
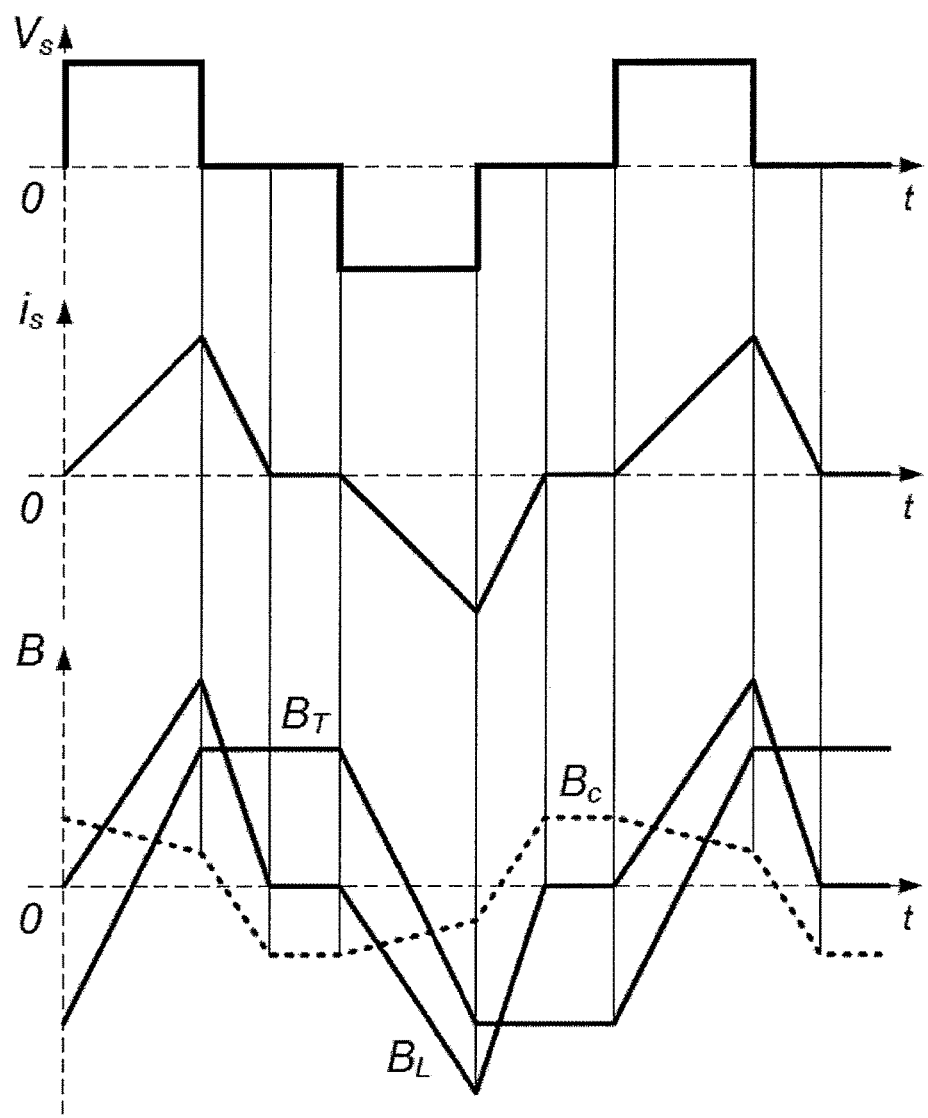
FIG. 5: runs of curves of voltage and current of secondary transformer winding as well as flux density (induction) in transformer core legs, choke core legs and centre legs.

FIG. 5 illustrates run of curve of voltage and current of secondary transformer winding as well as flux density (induction) in cores transformer, choke and centre legs. The flux density in centre core leg $B_c$ is reduced and therefore the core losses in there are minimized. When the transformer and inductor cores are fully separated the flux circulating in all transformer legs is $\Phi_{Td}$ and the flux flowing in all inductor legs is $\Phi_d$.

Figure 6:
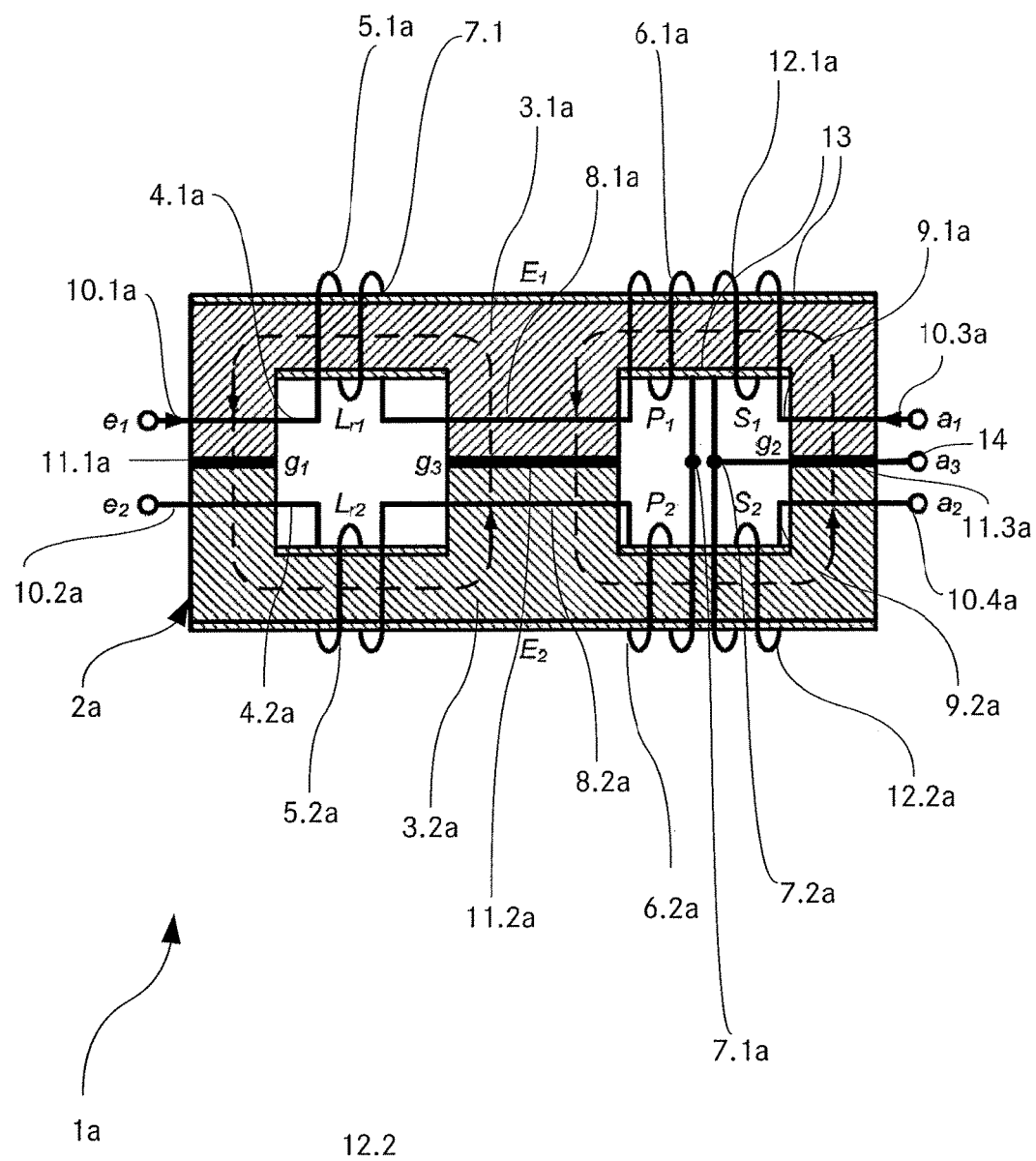
FIG. 6: schematic view of an integrated magnetic component according to the invention (second embodiment)

FIG. 6 shows a second embodiment of the invention. The integrated magnetic component 1a comprises an 8-shaped core structure 2a composed of two magnetic cores 3.1a and 3.2a and suits an LLC resonant converter like the one shown in FIG. 2.

Similarly to the embodiment shown in FIG. 3, the integrated magnetic component 1a comprises a first electric winding wire 4.1a and a supplementary first electric winding wire 4.2a. The first electric winding wire 4.1a comprises a wire end section 10.1a, a first winding 5.1a, a connecting section 8.1a and a second winding 6.1a. The supplementary first electric winding wire 4.2a comprises a wire end section 10.2a, a third winding 5.2a, a connecting section 8.2a and a fourth winding 6.2a. The first electric winding wire 4.1a and the supplementary first electric winding wire 4.2a are connected to each other via a soldering joint 7.1a.

Also similarly to the embodiment shown in FIG. 3, the integrated magnetic component 1a comprises a second electric winding wire 9.1a and a supplementary second electric winding wire 9.2a. The second electric winding wire 9.1a comprises a wire end section 10.3a and a fifth winding 12.1a. The supplementary second electric winding wire 9.2a comprises a wire end section 10.4a and a sixth winding 12.2a. The second electric winding wire 9.1a and the supplementary second electric winding wire 9.2a are connected to each other via a soldering joint 7.2a.

The 8-shaped core structure 2a comprises three air gaps 11.1a, 11.2a and 11.3a. Air gaps 11.1a and 11.3a separate the two lateral legs of each magnetic core 3.1a, 3.2a from the respective lateral legs of the other magnetic core 3.1a, 3.2a. The centre legs of the magnetic cores 3.1a, 3.2a are separated by air gap 11.2a.

The six windings 5.1a, 5.2a, 6.1a, 6.2a, 12.1a and 12.2a are wound directly—i.e. bobbin-less—on the four flanges of the 8-shaped magnetic core structure 2a supplied by the two magnetic cores 3.1a and 3.2a. The magnetic core structures 3.1a and 3.2a each comprise several slanted edges 13a. These slanted edges 13a are less prone to damaging the electric winding wires 4.1a, 4.2a, 9.1a and 9.2a than sharp 90-degree edges.

The integrated magnetic component 1a comprises an output wire 14, connected to the soldering joint 7.2a.

In contrast to the embodiment shown in FIG. 3, all wire end sections 10.1a, 10.2a, 10.3a and 10.4a as well as the connecting sections 8.1a and 8.2a are placed on the same side of the 8-shaped structure 2a.

With reference to FIG. 6 and FIG. 2, the first winding 5.1a is wound on a first flange of the first magnetic core 3.1a constituting the winding of the first resonant inductor $L_{r1}$. The second winding 6.1a is wound on a second flange of the first magnetic core 3.1a constituting the first primary winding P1 of the transformer T. The third winding 5.2a is wound on a first flange of the second magnetic core 3.2a constituting the winding of the second resonant inductor $L_{r2}$. The fourth winding 6.2a is wound on a second flange of the second magnetic core 3.2a constituting the second primary winding P2 of the transformer T. The fifth winding 12.1a is wound on the second flange of the first magnetic core 3.1a constituting the first secondary winding S1 of the transformer T. The sixth winding 12.2a is wound on the second flange of the second magnetic core 3.2a constituting the second secondary winding S2 of the transformer T.

Figure 7:
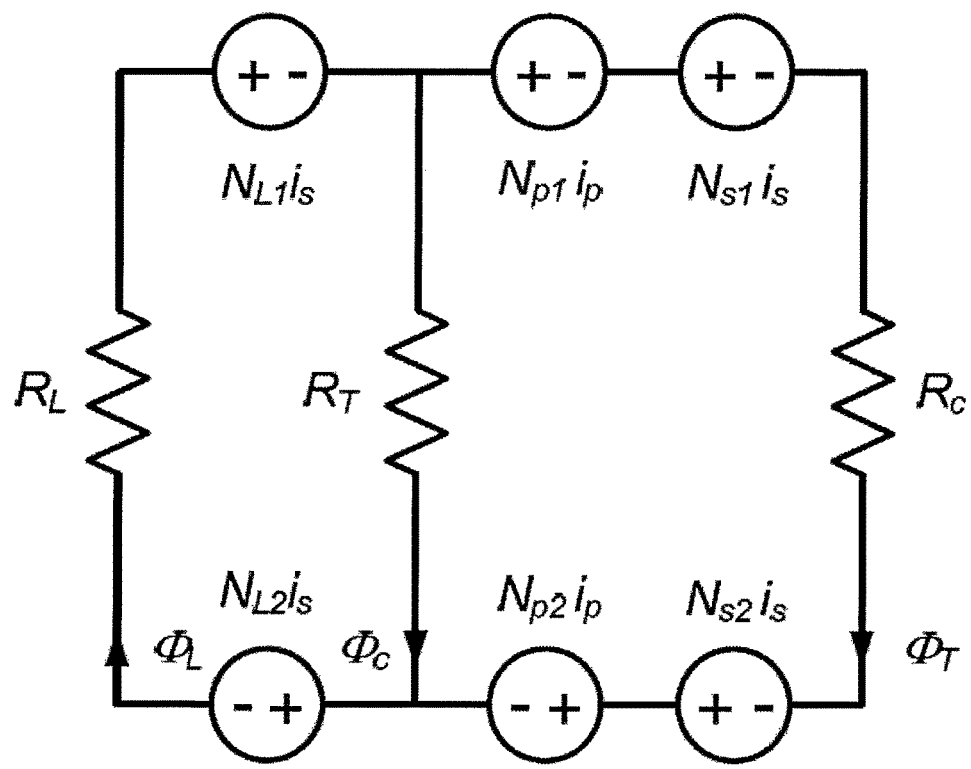
FIG. 7: reluctance model of the embodiment of FIG. 6.

The corresponding reluctance model of the embodiment of FIG. 6 is shown in FIG. 7. $R_L$ represents the reluctance of the inductance core (left lateral legs and transversal flanges of magnetic cores of magnetic cores 3.1a and 3.2a as shown in FIG. 6) with consideration of its respective air gaps 11.3a, $R_T$ represents the reluctance of transformer core (right lateral legs and transversal flanges of magnetic cores legs of magnetic cores 3.1a and 3.2a as shown in FIG. 6) with consideration of its respective air gaps 11.1a and $R_c$ represents the reluctance of the centre core (constituted by the two centre legs of the magnetic cores 3.1a and 3.2a) with consideration of its respective air gap 11.2a. After mathematical description of the reluctance model and application of Faraday's Law on all windings, some equation manipulations yield the inductance matrix of the integrated component which is calculated to be $$L = \begin{pmatrix} L_{11} & M_{12} \\ M_{12} & L_{22} \end{pmatrix}$$

$$= \begin{pmatrix} \dfrac{(R_L+R_c)\cdot N_p^2 + 2R_c \cdot N_p N_L + (R_T+R_c)\cdot N_L^2}{R_T\cdot(R_L+R_c)+R_L\cdot R_c} & \dfrac{(R_c\cdot N_L + (R_L+R_c)\cdot N_p)\cdot N_s}{R_T\cdot(R_L+R_c)+R_L\cdot R_c} \\ \dfrac{(R_c\cdot N_L + (R_L+R_c)\cdot N_p)\cdot N_s}{R_T\cdot(R_L+R_c)+R_L\cdot R_c} & \dfrac{(R_L+R_c)\cdot N_s^2}{R_T\cdot(R_L+R_c)+R_L\cdot R_c} \end{pmatrix}$$

With $$N_{p1}=N_{p2}=N_p/2,\ N_{s1}=N_{s2}=N_s\ \text{and}\ N_{L1}=N_{L2}=N_L/2.$$

Using calculated elements of the inductance matrix, primary $L_{11}$, secondary self inductances $L_{22}$ and the mutual inductance $M_{12}$, parameters of transformer π model, the magnetizing inductance Lm, the secondary leakage inductance Lr and the equivalent primary turn number $N_{pn}$ are respectively described as $$L_r = L_{11} - \dfrac{M_{12}^2}{L_{22}} = \dfrac{N_L^2}{R_L+R_c},$$

$$L_m = L_{11} - L_r = \dfrac{R_L+R_c}{R_T\cdot(R_L+R_c)+R_L\cdot R_c} N_{pn}^2 = \dfrac{N_{pn}^2}{R_T + R_L // R_c}$$

and $$N_{pn} = N_s \dfrac{L_m}{M_{12}} = N_p + \dfrac{R_c}{R_L+R_c} N_L.$$

$N_p$ turns are wound but the transformer exhibits $N_{pn}$ turns. By introducing an air gap in the centre leg, the effective primary number of turns $N_{pn}$ becomes higher than the factual number of turns $N_p$ which allows reducing primary copper losses.

For high permeability low saturation flux density material with no air gap in the centre core ($g_3 \approx 0$), just $R_c \ll R_L, R_T$, the gapped transformer and resonant inductor are magnetically decoupled and the primary leakage inductance $L_r$, the magnetizing inductance $L_m$ and the equivalent primary turn number $N_{pn}$ are simplified to be respectively:

$$L_r \approx \dfrac{N_L^2}{R_L},\ L_m \approx \dfrac{N_{pn}^2}{R_T}\ \text{and}\ N_{pn} \approx N_p.$$

The fluxes and flux densities of legs of this embodiment are calculated as with the integrated magnetics for the soft switching converter.

Figure 8:
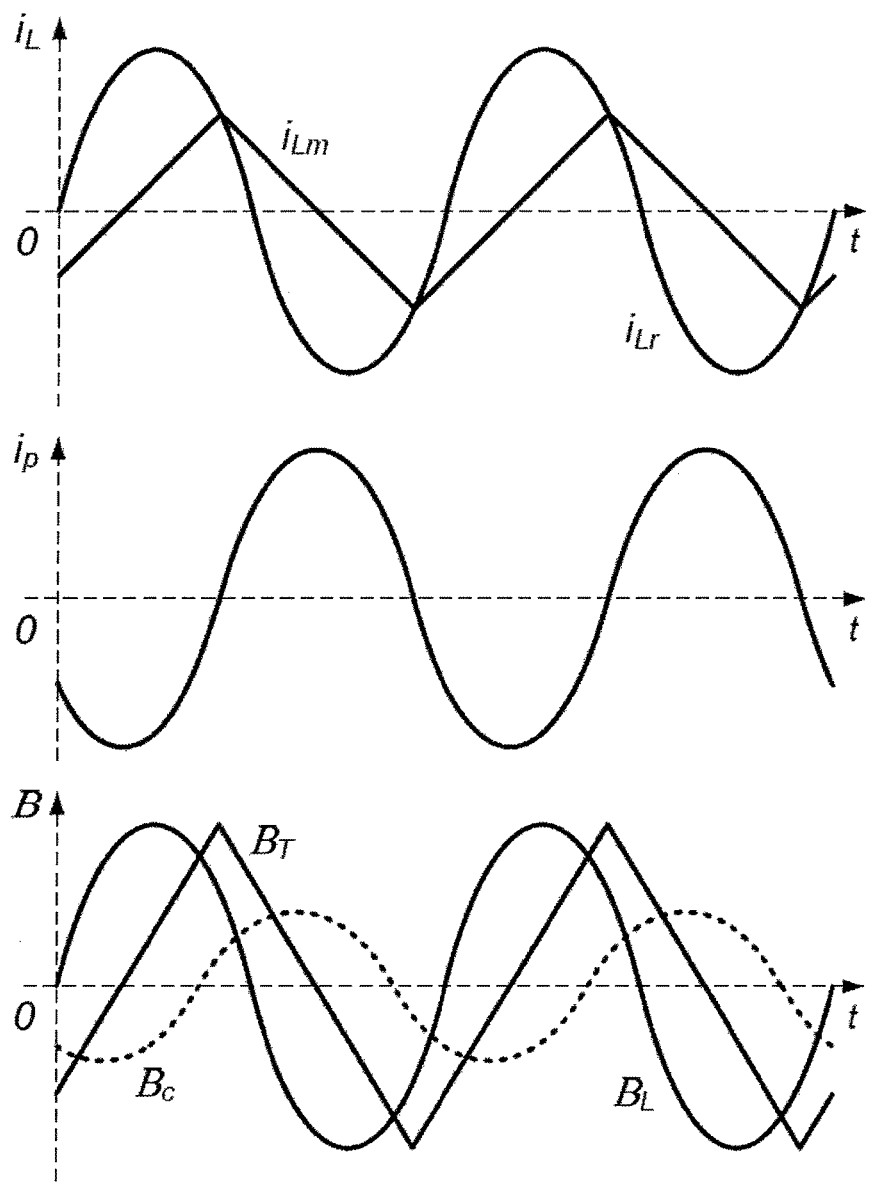
FIG. 8: runs of curves of series resonant choke current, parallel resonant choke current and primary winding current as well as flux density (induction) in transformer core legs, choke core legs and centre legs.

FIG. 8 illustrates run of curve of series resonant choke current, parallel resonant choke current and primary winding current as well as flux density (induction) in cores transformer, choke and centre legs. The flux density in centre core leg $B_c$ is reduced and therefore the core losses in there are minimized.

It is to be noted that the invention is not limited to the two embodiments described above. The scope of protection is rather defined by the patent claims.

| List of reference symbols | |
|---|---|
| 1 | Integrated magnetic component |
| 2 | 8-shaped core structure |
| 3.1, 3.2 | Magnetic cores |
| 4.1, 4.2 | First winding wires |
| 5.1, 5.2 | First winding, third winding |
| 6.1, 6.2 | Second winding, fourth winding |
| 7.1, 7.2 | Soldering joints |
| 8.1, 8.2 | Connecting sections |
| 9.1, 9.2 | Second winding wires |
| 10.1, 10.2, 10.3, 10.4 | Wire end sections |
| 11.1, 11.2, 11.3 | Air gaps |
| 12.1, 12.2 | Fifth winding, sixth winding |
| 13 | Slanted edge |
| 14 | Output wire |

The invention claimed is:

1. Switching mode power converter including a transformer, a parallel resonant inductor, two output filter chokes, and an integrated magnetic component, where the switched mode power converter is a soft switching converter, the integrated magnetic component comprising:
    two magnetic cores forming an 8-shaped core structure;
    a first electric winding wire constituting a winding of a first output filter choke wound on a first flange of a first magnetic core,
    the first electric winding wire further constituting a first secondary winding of the transformer wound on the second flange of the first magnetic core,
    a supplementary first electric winding wire constituting windings of a second output filter choke wound on a first flange of the second magnetic core,
    the supplementary first electric winding wire further constituting a second secondary winding of the transformer wound on the second flange of the second magnetic core, and
    a second electric winding wire constituting a first primary winding of the transformer wound on the second flange of the first magnetic core,
    a supplementary second electric winding wire constituting a second primary winding of the transformer wound on a second flange of the second magnetic core,
    wherein,
    the first magnetic core is an E-core, and the second magnetic core is an E-core of an I-core,
    the first electric winding wires are connected to each other and the second electric winding wires are connected to each other, and
    all windings are wound around the flanges of the magnetic cores such as to lead to a cancellation of flux in a common center leg of the magnetic cores.

2. The switched mode power converter according to claim 1, wherein at least one of the electric winding wires is wound directly on one of the magnetic cores.

3. The switched mode power converter according to claim 1, wherein the first electric winding wires are connected to each other by a first soldering joint and/or the second electric winding wires are connected to each other by a second soldering joint.

4. The switched mode power converter according to claim 1, wherein the 8-shaped core structure comprises an air gap.

5. The switched mode power converter according to claim 4, wherein the air gap is centrally located in the 8-shaped core structure.

6. The switched mode power converter according to claim 1, wherein the 8-shaped core structure comprises a slanted edge.

7. The switched mode power converter according to claim 1, wherein three windings are wound on each magnetic core.

8. A switched mode power converter including a transformer, a parallel resonant inductor, two resonant inductors, and an integrated magnetic component where the switched mode power converter is a LLC converter, the integrated magnetic component comprising:
    two magnetic cores forming an 8-shaped core structure; and
    a first electric winding wire constituting a winding of a first resonant inductor wound on a first flange of a first magnetic core,
    the first electric winding wire further constituting a first primary winding of the transformer wound on a second flange of the first magnetic core,
    a supplementary first electric winding wire constituting windings of a second resonant inductor wound on a first flange of a second magnetic core,
    the supplementary electric winding wire further constituting a second primary winding of the transformer wound on the second flange of the second magnetic core, and
    a second electric winding wire constituting a first secondary winding of the transformer wound on the second flange of the first magnetic core,
    a supplementary second electric winding wire constituting a second secondary winding of the transformer wound on a second flange of the second magnetic core,
    the first electric winding wires are connected to each other and the second electric winding wires are connected to each other,
    wherein,
    the first magnetic core is an E-core, and the second magnetic core is an E-core or an I-core, and
    all windings are wound around the flanges of the magnetic cores such as to lead to a cancellation of flux in a common center leg of the magnetic cores.

9. The switched mode power converter according to claim 8, wherein at least one of the electric winding wires is wound directly on one of the magnetic cores.

10. The switched mode power converter according to claim 8, wherein the first electric winding wires are connected to each other by a first soldering joint and/or the second electric winding wires are connected to each other by a second soldering joint.

11. The switched mode power converter according to claim 8, wherein the 8-shaped core structure comprises an air gap.

12. The switched mode power converter according to claim 11, wherein the air gap is centrally located in the 8-shaped core structure.

13. The switched mode power converter according to claim 8, wherein the 8-shaped core structure comprises a slanted edge.

14. The switched mode power converter according to claim 8, wherein three windings are wound on each magnetic core.

* * * * *